United States Patent [19]

Archer et al.

[11] Patent Number: 4,512,627
[45] Date of Patent: Apr. 23, 1985

[54] OPTICAL FIBER SWITCH, ELECTROMAGNETIC ACTUATING APPARATUS WITH PERMANENT MAGNET LATCH CONTROL

[75] Inventors: Wendel E. Archer, Gahanna; James M. Luther, Pataskala; Michael L. Thieken, Glenford, all of Ohio

[73] Assignee: AT&T Bell Laboratories, Murray Hill, N.J.

[21] Appl. No.: 449,435

[22] Filed: Dec. 13, 1982

[51] Int. Cl.³ .................. G02B 7/26; H01H 67/02; H01F 7/08
[52] U.S. Cl. .................. 350/96.20; 335/136; 335/259; 335/267; 350/96.21
[58] Field of Search ............... 350/96.15, 96.20, 96.21; 310/14, 24, 30, 34, 35; 335/131, 136, 259, 267; 370/1

[56] References Cited

U.S. PATENT DOCUMENTS

| | | | |
|---|---|---|---|
| 3,470,320 | 9/1969 | Pike et al. | 350/96.20 |
| 4,193,662 | 3/1980 | Hara | 350/96.15 |
| 4,220,396 | 9/1980 | Antell | 350/96.15 |
| 4,299,252 | 11/1981 | Reinicke | 335/229 |
| 4,407,562 | 10/1983 | Young | 350/96.20 |
| 4,415,229 | 11/1983 | McCullough | 350/96.20 |
| 4,452,507 | 6/1984 | Winzer | 350/96.20 |

FOREIGN PATENT DOCUMENTS 2031609A  4/1980  United Kingdom .

OTHER PUBLICATIONS

Rawson et al., *Optical Engineering*, vol. 19, No. 4, Jul.-/Aug. 1980, "A Fiber Optical Relay for Bypassing Computer Network Repeaters", pp. 628-629.
Young et al., *Electronics Letters*, vol. 17, No. 16, Aug. 6, 1981, "Cascaded Multipole Switches for Single Mode and Multimode Optical Fibers", pp. 571-573.
Young et al., Conference: IOOC, '81, Third International Conference on Integrated Optics and Optical Fiber Communications, San Francisco, CA, USA, Apr. 27-29 1981, "Moving Optical Fiber Array Switch for Multimode and Single-Mode Fibers", p. 126.

*Primary Examiner*—William L. Sikes
*Assistant Examiner*—Frank González
*Attorney, Agent, or Firm*—Dwight Marshall

[57] ABSTRACT

Actuating apparatus for an optical fiber switch in which a single fiber array (19) retained in a retaining block (20, 21) is movable within a housing (17) to align the single array (19) with one (10) or the other (11) of two fixed fiber arrays. A shuttle element (25) slidably extending through the housing (17) has provided at each end a disc (30, 31) the inner surfaces of which control the movement of a pair of push-rods (42, 43), also extending through the housing (17), which push-rods (42, 43) are bearable on opposite sides of the retaining blocks (20, 21). Reciprocal movement of the shuttle element (25) causes the same movement of the push-rods (42, 43) to move the movable fiber array (19) between its two switch positions. Movement of the shuttle element (25) is caused by the selective energization of two electromagnets (50, 51) mounted in opposite walls (40, 41) of an hermetically sealed outer housing (18). A pair of permanent magnets (35, 36) also mounted at opposite ends of the shuttle element (25) make possible a latching action of the apparatus.

21 Claims, 3 Drawing Figures

OPTICAL FIBER SWITCH, ELECTROMAGNETIC ACTUATING APPARATUS WITH PERMANENT MAGNET LATCH CONTROL

TECHNICAL FIELD

This invention relates to optical fiber switches and more particularly to actuating apparatus for such switches.

BACKGROUND OF THE INVENTION

Recent advances in optical fiber technology have promoted the use of these light conducting elements as promising alternate media in the transmission of information signals. Typically, such fibers are light-transparent glass threads on the order of 0.01 inch or less in diameter encased in a sheath or cladding to which it is fused. Light enters at one end of the fiber and emerges from the opposite end with minimal loss. The physics of light transmission through a continuous fiber is now well-understood and need not be considered in detail for an understanding of the actuating mechanism of the invention. As in its electrical counterpart, the transmission of information signals in the form of light pulses for broad circuit applications requires some means for switching between one light transmission path and two or more other such paths. This has long been readily accomplished in the analogous transmission of electrical signals by providing electromechanical relay or switch means which are interposed in the circuits to be controlled. The electrical conductors of the circuits are simply soldered or otherwise connected to the relay or switch terminals. The switching of light transmission paths which include optical fibers has been accomplished more directly. Known optical fiber switching arrangements have generally contemplated the coupling of the actual light conducting media themselves without intervening contacting or circuit completion apparatus. Switching of light transmission paths thus presently involves the mechanical movement of the end of the actual conductive fiber itself out of alignment with the end of a second fiber and into alignment with the end of a third fiber. One such switching arrangement is disclosed in the copending application of W. C. Young, now U.S. Pat. No. 4,407,562, issued Oct. 4, 1983. As therein disclosed, two parallel rows of optical fibers are fixedly retained between silicon retaining blocks within an enclosing housing, the ends of the fibers lying in a common plane at the faces of the blocks. A third row of fibers, corresponding to the fibers in each of the two rows, is also retained between silicon retaining blocks, the ends of the fibers also lying in a common plane facing the ends of the first two rows of fibers. The blocks retaining the third row of fibers are movable within the housing to align the ends of the latter row with the corresponding ends of the fibers of either the first or second row of fibers. To accomplish this movement, a pair of opposing solenoids extending through the housing walls are contemplated which act upon opposite sides of the movable silicon block. Since the switching arrangement of the Young disclosure deals largely with the problem of positively retaining the optical fiber rows and maintaining their precise transverse and angular alignment during and after a switching operation, the actuating mechanism is referred to only to the extent of indicating that it comprises a pair of magnetically operated cores or solenoids acting directly upon the silicon retaining blocks.

A number of problems associated with the electromagnetic actuation of optical fiber switches generally are thus not addressed in the switching arrangement above briefly considered. The housing occupied by the fibers, for example, is filled with a suitable silicon type indexing fluid to minimize transmission losses between the fiber ends. To this end it is important that the transparency of the fluid be unaffected by contamination such as may result from chemical interactions with elements of incompatible materials also enclosed within the housing. Thus, if the number of active elements of the actuating mechanism within the housing is reduced to a minimum, the risk of fluid contamination is also reduced. The retention of the indexing fluid within the housing has in the past also presented a problem. This is especially the case where operating elements, such as the solenoids contemplated in the Young disclosure cited in the foregoing, movably extend through the housing walls. Adequate seals about the movable elements must be provided to prevent any fluid leakage. Such seals are costly and less than completely reliable over the long term. It is to these and other problems that the optical fiber switch actuating mechanism of the invention is chiefly directed.

SUMMARY OF THE INVENTION

An illustrative optical fiber switch mechanism according to the principles of the invention provides for the enclosure and sealing of all its movable elements within the housing also enclosing the movable and fixed optical fiber ends. Both of the latter fiber groups may be retained by silicon retaining blocks such as described in the Young disclosure cited hereinbefore. A pair of electromagnets are mounted on opposite sides of the housing, the ends including the core ends are sealed from the housing interior, the magnets, when selectively energized, controlling the reciprocal motion of an actuator shuttle element within the housing. The actuator shuttle element has provided on its ends a pair of discs which in turn control the reciprocal movement of a pair of pushrods which operate against opposite sides of the movable silicon block to selectively move the ends of a first set of optical fibers into abutment with the ends of a second and third set of fixed optical fibers. To augment the applied forces of the electromagnets and to provide for a latching action, a pair of permanent magnets are inset in the ends of the actuator shuttle element.

BRIEF DESCRIPTION OF THE DRAWING

The organization and operation of an optical fiber switch actuating mechanism according to the principles of the invention together with its features will be better understood from a consideration of the detailed description of one illustrative embodiment thereof which follows when taken in conjunction with the accompanying drawing in which.

DETAILED DESCRIPTION

Figure 1:
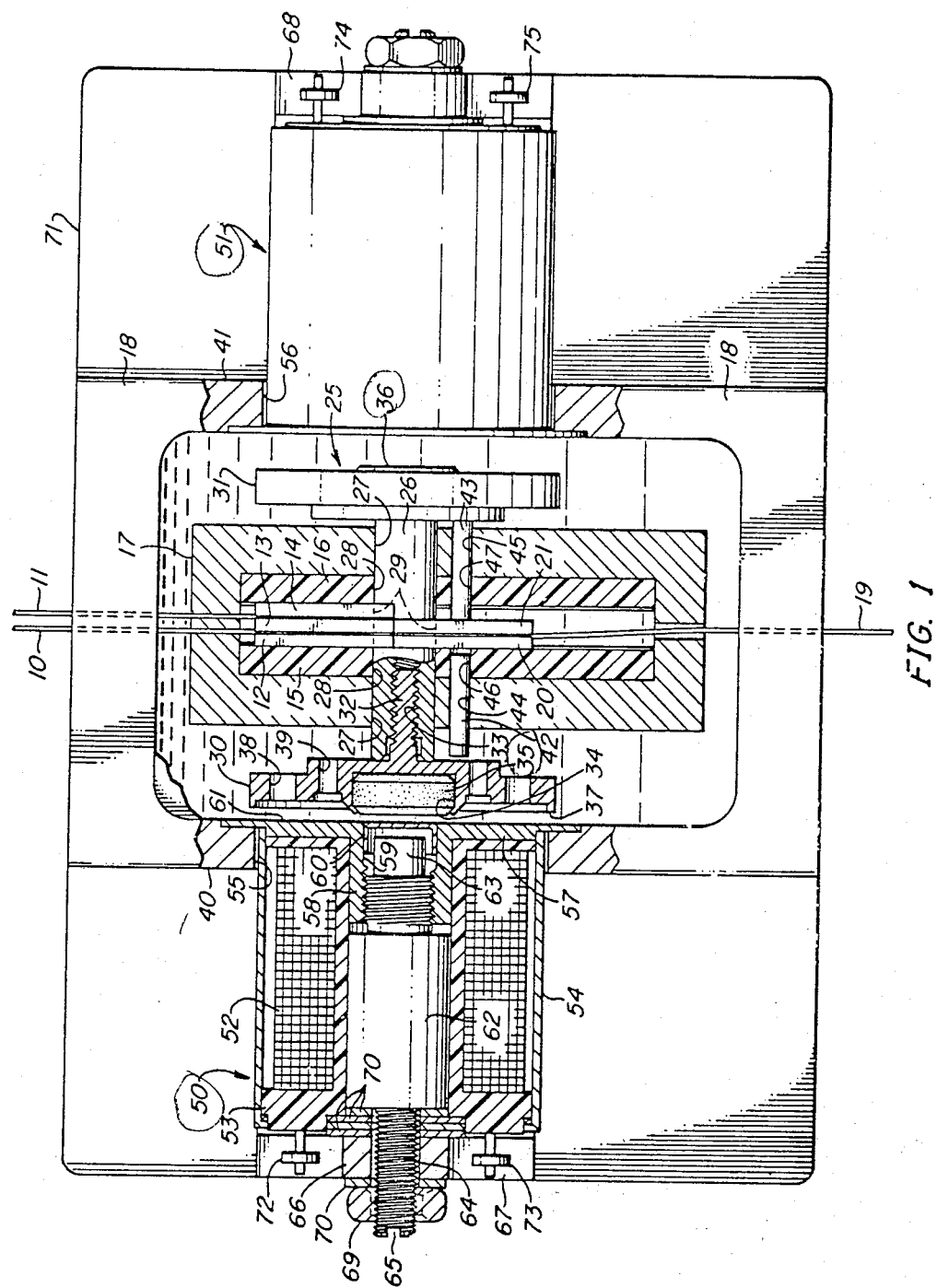
FIG. 1 is a top plan view of an optical fiber switch actuating mechanism according to the invention, the view being partially sectioned and broken away better to show its details.

Although not limited thereto, the switch actuating mechanism of the invention maybe advantageously adapted to control the operation of an optical fiber switch of the character described, for example, in the Young disclosure previously cited herein. As there described and as shown in FIG. 1, two parallel arrays of optical fibers 10 and 11 (single end ones shown) are retained between silicon retaining blocks 12, 13, and 14 which in turn are fixedly clamped between silicon side blocks 15 and 16 fitted within a rectangular housing 17. Fiber arrays 10 and 11 extend through one end of housing 17 and then through an outer rectangular housing 18 for connection to external circuitry not shown. Another array of optical fibers 19 (single end one shown) corresponding in number and alignment to the fibers of each fiber array 10 and 11 are retained between silicon retaining blocks 20 and 21 which are bonded together to form a single element movable between silicon side blocks 15 and 16. Fiber array 19 extends through the opposite end of housing 17 and then through outer housing 18 for connection to external circuitry not shown.

Figure 2:
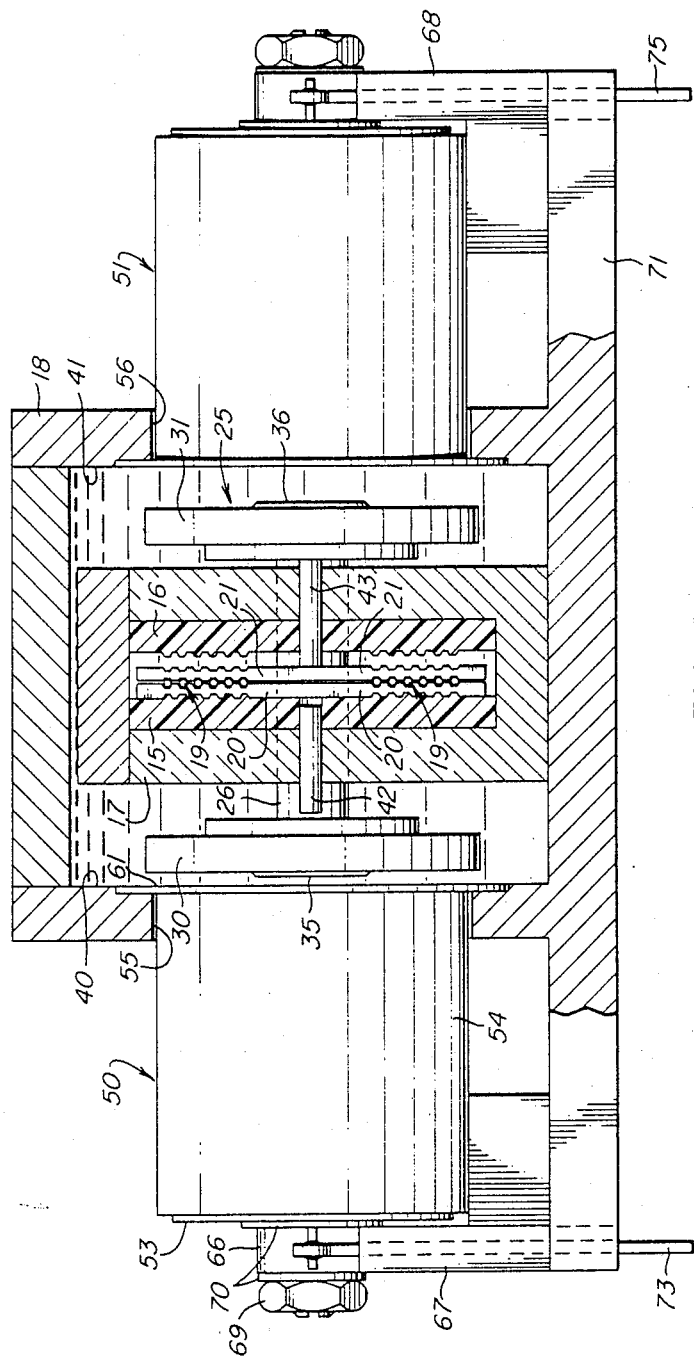
FIG. 2 is a side view of the mechanism of FIG. 1, also partially sectioned and broken away.

As shown in FIG. 2 with respect to movable retaining blocks 20 and 21, the optical fibers of each array are clasped in individual grooves formed in the inner faces of the silicon retaining blocks to ensure accurate alignment. Further, the outer faces of blocks 20 and 21 are similarly grooved to present teeth which are mateable with corresponding grooves formed in the inner faces of side blocks 15 and 16. The ends of fiber arrays 10 and 11 and 19 terminate at the abutting faces of retaining blocks 12-14 and 20, 21, respectively, fiber array 19 being shown in FIGS. 1 and 2 as being in alignment with fiber array 10 thereby making an optical coupling between the fibers of the two arrays. As mentioned, bonded blocks 20 and 21 are movable to switch this coupling of fiber array 19 from fiber array 10 to fiber array 11 and back. An illustrative fiber optical switch of the character contemplated for association with the actuating mechanism of the invention has thus been described in sufficient detail for a complete understanding of the present invention. More complete details of the optical fiber switch considered in the foregoing may be found in the Young disclosure cited hereinbefore.

Figure 3:
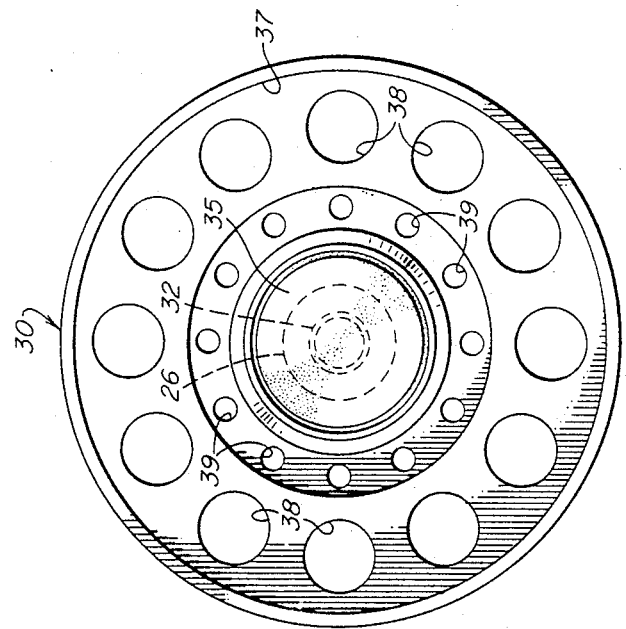
FIG. 3 is a slightly enlarged, end view of one of the movable elements of the actuating mechanism of FIGS. 1 and 2.

An optical fiber switch actuating mechanism according to the principles of the invention is shown in partial section in FIG. 1 and also in FIG. 2 and comprises a shuttle 25 in turn comprising a cylindrical rod 26 which is slip-fitted through aligned holes 27 in the side walls of housing 17, aligned holes 28 in silicon side blocks 15 and 16, and circular cut-aways 29 in fiber retaining blocks 12, 13, 14, 20, and 21 of the optical fiber switch (For this reason, as shown in FIG. 2, the optical fiber arrays are separated into two groups each, one on either side of rod 26.) Shuttle 25 further comprises a pair of circular discs 30 and 31 mounted respectively at each end of rod 26. Discs 30 and 31 are identical and each is formed (see section view of FIG. 1) to present at one side a central threaded stem 32 adapted to be fitted in a threaded hole 33 at each end of rod 26. At the other side (see disc 30) each of the discs has a recess 34 formed therein in which is press-fitted a permanent magnet 35 and 36. As shown in FIGS. 1 and 3, each of the discs is recessed at one side to present a peripheral lip 37 and is provided on its outer flange with a plurality of equally spaced apertures 38. A similar arrangement of smaller apertures 39 is formed on an inner flange of each disc. The purposes of apertures 38 and 39 will become apparent from a description of an illustrative operation of the mechanism hereinafter. Shuttle 25, which is completely enclosed within outer housing 18, is freely laterally movable away from and toward the parallel walls 40 and 41 of rectangular housing 18 to control a pair of floating push-rods 42 and 43. Rods 42 and 43 lie coaxially along an axis parallel to the longitudinal axis of rod 26 and slidably extend through apertures 44 and 45 in the side-walls of housing 17 and apertures 46 and 47 of silicon side blocks 15 and 16, respectively. Opposing ends of rods 42 and 43 are bearable against opposite faces of fiber retaining blocks 20 and 21, respectively, the other ends of rods 42 and 43 being bearable against facing annular bearing surfaces on inner flanges of discs 30 and 31, respectively. Rods 42 and 43 are of equal length, the length and that of rod 26 being determined so that the movement of shuttle 25 in either direction is arrested when an inner flange of a disc 30 or 31 has caused a push-rod 42 or 43 to move the bonded fiber retaining blocks 20 and 21 to seat in the grooves of silicon side-blocks 15 or 16. As illustrated in FIGS. 1 and 2, shuttle 25 is arrested in its left-ward movement when disc 31, through push-rod 43, has seated retaining block 20 in the grooves of side block 15. (See FIG. 2). The lengths of push-rods 42 and 43 are such that, at this time push-rod 42 is just short of the distance between the inner flange of disc 30 and the seated surface of retaining block 20. In this position of shuttle 25, the ends of movable fiber array 19 are precisely aligned with the ends of fiber array 10. A rightward movement of shuttle 25 as viewed in the drawing, by the identical action of push-rod 42, seats retaining block 21 in the grooves of side-block 16. The ends of fiber array 19 are thereby moved out of alignment with the ends of fiber array 10 and into precise alignment with the ends of fiber array 11. Advantageously, connecting rod 26, in the illustrative embodiment being described, is also freely rotatable within apertures 27 of the side-walls of housing 17. As a result, even though shuttle 25 is rotated during numbers of operations, the ends of push-rods 42 and 43 will find even bearing points on the annular bearing surfaces of discs 30 and 31. The entire space within housings 17 and 18 about the enclosed elements is filled with a suitable index matching fluid which advantageously also acts as a lubricant for the movement of rods 26, 42, and 43. Apertures 38 and 39 of discs 30 and 31 not only serve to reduce the mass of shuttle 25, but also reduce the resistance presented by the fluid as the discs are moved therethrough. Rods 26, 42, and 43 may be fabricated of a suitable aluminum bronze alloy and discs 30 and 31 may be formed of a soft magnetic stainless steel.

The lateral movement of shuttle 25 is magnetically controlled by a pair of electromagnets 50 and 51 mounted in the opposite walls 40 and 41, respectively, of outer housing 18. Electromagnets 50 and 51 are identical and their details may be described with particular reference to electromagnet 50 as shown in the section view thereof in FIG. 1. The coil 52 of each electromagnet is conventionally wound on a bobbin 53 which is enclosed in a housing 54. Although the electromagnets could be operated through the side walls 40 and 41 of housing 18, in the illustrative embodiment of the mechanism being described, side walls 40 and 41 have openings 55 and 56 formed therein to receive a circular insert 57. Insert 57, which may be formed of a copper beryllium alloy, is provided with a stem 58 which is drilled to present a hole 59 which is threaded for approximately half its depth from the stem end. A cup insert 60 of a magnetic material is fitted into the other, unthreaded end of hole 59 having its closed end flush with the inner surface 61 of insert 57. Insert 61 is flanged at its periphery to fit a corresponding annular recess formed in circular opening 55 of wall 40 so that the entire inner surface 61 of insert 57 is flush with the inner surface of wall 40. Cup insert 60 is maintained in insert 57 and the latter is maintained in wall 40 in any suitable manner which also provides an hermetic seal of housing 18. Each of the electromagnets 50 and 51 has a cylindrical core 62 (see electromagnet 50) slidably fitted in a central aperture of bobbin 53. A core 62 has extending from one end a partially threaded stem 63 adapted to mesh with the threads of stem 58 of insert 57, the face of stem 63 being spaced-apart from the inner face of magnetic insert 60. At its other end core 62 has extending therefrom a stem 64 having a slot 65 formed across its end. Stem 64 extends outside housing 54 of electromagnet 50 through a drilled lug 66 of a molded terminal block assembly, such as assemblies 67 and 68 supporting the other ends of electromagnets 50 and 51, respectively. Core 62 is manually rotatable by screwdriver means in slot 65 to adjust the gap between the face of stem 63 and the inner face of cup insert 60 for optimum magnetic operation. Stem 64 is threaded to receive a locking nut 69 to lock core 62 in place by means of washers 70 acting on opposite sides of lug 66 after adjustment of core 62 is completed. Electromagnets 50 and 51 are supported in side-walls 40 and 41 and on terminal block assemblies 67 and 68 so that their cores, such as core 62, share common longitudinal axes with the longitudinal axis of rod 26 of shuttle 25. As shown in FIG. 2, housings 17 and 18 as well as terminal block assemblies 67 and 68 are affixed in any convenient manner to a supporting base 71. Molded in terminal block assemblies 67 and 68 are pairs of terminal pins 72–73 and 74–75, respectively, which extend through base 71 to connect the terminals of the electromagnet coils 52 to external energizing circuitry not shown.

Permanent magnets 35 and 36 fitted in opposite ends of shuttle 25 advantageously permit a number of energizing modes of electromagnets 50 and 51 and also accomplish a latching action of shuttle 25 when a switching operation of fibers 19 has been completed. The latter action is demonstrated in FIG. 1, for example, where pushrod 43 is shown as urging the optical fiber switch in one of its two positions by the left-ward (as viewed in the drawing) movement of shuttle 25. This position is maintained by the magnetic attractive forces existed between the end 63 of core 62 and permanent magnet 35. Since the gap between the latter elements is smaller than the gap between the corresponding elements at the other end of shuttle 25, the magnetic forces will be greater thereby latching the optical fiber switch in the position shown. The same action would latch the optical fiber switch in its other position were shuttle 25 moved in the right-ward direction through the energization of electromagnets 50 and 51.

Advantageously, the actuating mechanism of the invention may be operated by applying current to electromagnets 50 and 51 individually or simultaneously. Thus, for example, the optical fiber switch may be switched from the position shown in the drawing to its other position by applying a current to terminal pins 72 and 73 of electromagnet 50 alone of a direction and magnitude so that a repulsive magnetic force is generated between core 62 and permanent magnet 35. Alternatively, a current may be applied to terminal pins 74 and 75 of electromagnet 51 alone of a direction and magnitude so that an attractive magnetic force is generated between its core and permanent magnet 36 greater than the attractive force existing between permanent magnet 35 and core 62. Both of the foregoing operative modes may be accomplished simultaneously by applying to the terminals of electromagnets 50 and 51 currents of directions and magnitudes so that a repulsive magnetic force is generated between core 62 and permanent magnet 35 and an attractive magnetic force is generated between the core of electromagnet 51 and permanent magnet 36.

What has been described is considered to be one specific illustrative optical fiber switch actuating apparatus according to the principles of the invention. Accordingly, it is to be understood that various and numerous other arrangements may be devised by one skilled in the art without departing from the spirit and scope of the invention as limited only by the accompanying claims.

What is claimed is:

1. Actuating apparatus for controlling the movement of a body from a first to a second position comprising a push-rod mounted on one side of said body to be freely movable in either direction along its longitudinal axis to bring one end of said rod into contact with one side of said body, a shuttle element comprising a connecting rod mounted to be freely movable in either direction along its longitudinal axis and a first actuating magnetic member provided at one end of said connecting rod transverse to its said longitudinal axis for latching said shuttle element in said first and second positions, said actuating member having a bearing surface for contacting the opposite end of said push-rod, and an electromagnet having a core positioned for magnetic coupling with said actuating magnetic member to release said shuttle element from one of said positions and position said shuttle element in another of said positions.

2. Actuating apparatus as claimed in claim 1 also comprising a permanent magnet associated with said actuating member, said magnet being positioned for magnetic interaction with said core when said electromagnet is energized.

3. Actuating apparatus as claimed in claims 1 or 2 in which said connecting rod is mounted for free rotation abouts its longitudinal axis and in which said actuating member is substantially circular about said last-mentioned axis, said bearing surface being substantially annular.

4. Actuating apparatus for controlling the movement of a body between a first and a second position comprising a pair of push-rods mounted on either side of said body to be freely movable in either direction along their longitudinal axes to bring corresponding ends of said rods into contact with opposite sides of said body, a shuttle element comprising a connecting rod mounted to be freely movable in either direction along its longitudinal axis and a pair of actuating magnetic members provided at opposite ends of said connecting rod substantially transverse to said axis of said connecting rod for latching said shuttle in said first and second positions, said actuating members having facing bearing surfaces for contacting the corresponding opposite ends of said pushrods, and an electromagnet having a core positioned for magnetic coupling with one of said actuating magnetic members to release said shuttle element from one of said positions and attract said shuttle element to another of said positions.

5. Actuating apparatus as claimed in claim 4 also comprising a permanent magnet associated with said one of said actuating members, said magnet being positioned for magnetic interaction with said core when said electromagnet is energized.

6. Actuating apparatus as claimed in claim 4 also comprising a second electromagnet having a core positioned for magnetic coupling with the other of said actuating magnetic members.

7. Actuating apparatus as claimed in claim 6 also comprising a second permanent magnet associated with said other of said actuating magnetic members, said second magnet being positioned for magnetic interaction with said core of said second electromagnet when said last-mentioned electromagnet is energized.

8. Actuating apparatus as claimed in claims 4, 5, 6, or 7 in which said connecting rod is mounted for free rotation about its longitudinal axis and in which each of said actuating members is substantially circular about said last-mentioned axis, said facing bearing surfaces being substantially annular.

9. Actuating apparatus for controlling a signal switching device, said device comprising a retaining means for a conductor mounted for movement between two operative positions, said retaining means having opposite bearing surfaces, said apparatus comprising a shuttle element comprising a connecting rod mounted to be freely movable in either direction along its longitudinal axis and a pair of actuating members of a magnetic material provided at opposite ends of said connecting rod substantially transverse to said axis for latching said shuttle in one of said operative positions, said actuating members having facing bearing surfaces; a pair of push-rods mounted to be movable in either direction along their longitudinal axes, said push-rods being arranged, respectively, between said facing bearing surfaces of said actuating members and said opposite bearing surfaces of said retaining means, and an electromagnet having a core positioned for magnetic coupling with one of said actuating members to release said shuttle from one of said latched operative positions and attract said shuttle to another of said latched operative positions.

10. Actuating apparatus as claimed in claim 9 also comprising a permanent magnet associated with said one of said actuating members, said permanent magnet being positioned for magnetic coupling with said core.

11. Actuating apparatus as claimed in claims 9 or 10 in which said conductor comprises an optical fiber.

12. Actuating apparatus as claimed in claim 9 also comprising a second electromagnet having a core positioned for magnetic coupling with the other of said actuating members.

13. Actuating apparatus as claimed in claims 9 or 12 in which said actuating members are substantially circular about said axis of said connecting rod.

14. Actuating apparatus as claimed in claim 12 also comprising a permanent magnet associated with said other of said actuating members, said last-mentioned permanent magnet being positioned for magnetic coupling with said core of said second electromagnet.

15. Actuating apparatus as claimed in claims 12 or 14 in which said conductor comprises an optical fiber.

16. Actuating apparatus for controlling an optical fiber switching device, said device comprising a first housing having a pair of opposite walls and a retaining means for an optical fiber mounted for moving the end of said fiber between two operative positions within said housing, such retaining means having opposite bearing surfaces, said apparatus comprising a shuttle element comprising a connecting rod mounted through apertures in said pair of opposite walls of said first housing to be freely movable in either direction along its longitudinal axis and a pair of actuating members of a magnetic material provided at opposite ends of said connecting rod transverse to said axis for latching said shuttle element in ones of said operative positions, said actuating members having facing bearing surfaces outside of said first housing; a pair of push-rods extending through apertures in said opposite side walls of said first housing on either side of said retaining means, said push-rods being movable in either direction along their longitudinal axes and being arranged, respectively, between said facing bearing surfaces of said actuating members and said opposite bearing surfaces of said retaining means, a second housing enclosing said shuttle element having a pair of opposite side walls, and an electromagnet mounted in one of said last-mentioned side walls, said electromagnet having a core positioned for magnetic coupling with one of said actuating members to release said shuttle element from one of said latched operative positions and attract said shuttle element to another of said latched operative positions.

17. Actuating apparatus as claimed in claim 16 also comprising a permanent magnet associated with said one of said actuating members, said permanent magnet being positioned for magnetic coupling with said core.

18. Actuating apparatus as claimed in claim 16 also comprising a second electromagnet mounted in the other side-wall of said second housing, said second electromagnet having a core positioned for magnetic coupling with the other of said actuating members.

19. Actuating apparatus as claimed in claim 18 also comprising a permanent magnet associated with the other of said actuating members, said last-mentioned permanent magnet being positioned for magnetic coupling with said core of said second electromagnet.

20. Actuating apparatus as claimed in claims 17 or 19 in which said second housing is hermetically sealed and in which the space within said first and second housings contains an optical fiber index matching fluid.

21. Actuating apparatus as claimed in claims 17 or 19 in which each of said actuating members is substantially circular about said axis of said connecting rod and in which said connecting rod is freely rotatable within said apertures of said opposite side-walls of said first housing.

* * * * *